(12) United States Patent
Bonner et al.

(10) Patent No.: US 7,848,964 B2
(45) Date of Patent: *Dec. 7, 2010

(54) METHOD FOR SHOPPING IN A STORE

(75) Inventors: Brett Bracewell Bonner, New Richmond, OH (US); Christopher Todd Hjelm, Cincinnati, OH (US)

(73) Assignee: Sunrise R&D Holdings, LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/688,077

(22) Filed: Jan. 15, 2010

(65) Prior Publication Data
US 2010/0136918 A1 Jun. 3, 2010

Related U.S. Application Data

(63) Continuation-in-part of application No. 12/172,326, filed on Jul. 14, 2008, now Pat. No. 7,672,876.

(51) Int. Cl.
*G06Q 30/00* (2006.01)
*H04L 12/56* (2006.01)

(52) U.S. Cl. ........................ 705/26; 370/406

(58) Field of Classification Search .................. 705/26, 705/27; 370/406
See application file for complete search history.

(56) References Cited

U.S. PATENT DOCUMENTS

| 5,434,775 | A  | 7/1995  | Sims |
| 6,032,127 | A  | 2/2000  | Schkolnick |
| 6,347,079 | B1 | 2/2002  | Stephens |
| 6,382,357 | B1 | 5/2002  | Morrison |
| 6,522,641 | B1 | 2/2003  | Siu |
| 6,725,206 | B1 | 4/2004  | Coveley |
| 6,879,574 | B2 | 4/2005  | Naghian |
| 7,283,048 | B2 | 10/2007 | Stilp |
| 7,301,455 | B2 | 11/2007 | McKenna |
| 7,416,123 | B2 | 8/2008  | Saperstein |
| 7,504,937 | B2 | 3/2009  | McKenna |
| 2002/0161658 | A1 | 10/2002 | Sussman |
| 2004/0235468 | A1 | 11/2004 | Luebke |
| 2005/0080894 | A1 | 4/2005  | Apostolopoulos |

(Continued)

FOREIGN PATENT DOCUMENTS

CN          1953408 A       4/2007

(Continued)

OTHER PUBLICATIONS

Repas, Robert, "Industrial Sensing the Wireless Way," Machine Design, Jan. 6, 2005, v77n1, pp. 104, 106, 108, 110.

(Continued)

*Primary Examiner*—Jeffrey A Smith
*Assistant Examiner*—Brandy Zukanovich
(74) *Attorney, Agent, or Firm*—Theodore P. Cummings, Esq.

(57) ABSTRACT

A method for shopping in a store is provided using a multi-network for communication in a store and a wireless end device that may be held approximate to a shopper as a shopper moves about a store and whereby a shopper uses the wireless end device to send and receive information to the store though the multi-network.

6 Claims, 11 Drawing Sheets

U.S. PATENT DOCUMENTS

| | | |
|---|---|---|
| 2006/0186973 A1 | 8/2006 | Satou |
| 2006/0193262 A1 | 8/2006 | McSheffrey |
| 2006/0266825 A1 | 11/2006 | Do |
| 2006/0293779 A1 | 12/2006 | Nishri |
| 2006/0293968 A1 | 12/2006 | Brice |
| 2007/0063837 A1 | 3/2007 | McKenna |
| 2007/0138268 A1 | 6/2007 | Tuchman |
| 2007/0250613 A1 | 10/2007 | Gulledge |
| 2008/0025208 A1 | 1/2008 | Chan |
| 2008/0030319 A1 | 2/2008 | McKenna |
| 2008/0032705 A1 | 2/2008 | Patel |
| 2008/0040509 A1 | 2/2008 | Werb |
| 2008/0056261 A1 | 3/2008 | Osborn |
| 2008/0059297 A1 | 3/2008 | Vallier |
| 2008/0074254 A1 | 3/2008 | Townsend |
| 2008/0147461 A1 | 6/2008 | Lee |
| 2008/0170580 A1 | 7/2008 | Goldman |

FOREIGN PATENT DOCUMENTS

| | | |
|---|---|---|
| JP | 02309494 A | 12/1990 |
| WO | 2006137065 A2 | 12/2006 |
| WO | 2007085826 A1 | 8/2007 |

OTHER PUBLICATIONS

Chediak, Mark, "Retail Technology; Grocers Get a Taste of Future; Store Owners Who Want to Stand Out in the Crowd These Days are Embracing Cutting-Edge Services," The Orlando Sentinel, Jan. 21, 2006.

METHOD FOR SHOPPING IN A STORE

CROSS REFERENCE TO RELATED APPLICATION

This nonprovisional patent application is a continuation-in-part and claims priority to U.S. patent application Ser. No. 12/172,326 filed on Jul. 14, 2008.

FIELD OF THE INVENTION

The invention relates to a method for shopping by a shopper in a store and a multi-network for shopping in a store. In particular, a communications multi-network is provided that enables a shopper to communicate through the multi-network to send and receive information from the store.

BACKGROUND OF THE INVENTION

The prior art is rife with attempts to enhance the shopping experience between a shopper and a store. These attempts are oriented to move a shopper through a store faster, help a shopper find items on a store shelf, keep track of the shopper moving throughout the store and aid a shopper to check-out quickly. Unfortunately, many of these attempts have been highly complex, labor intensive, extremely expensive to implement, maintain and/or replace. Often, these attempts have negatively impacted store profits, caused higher store costs passed onto the shopper and have been deemed unreliable and undependable in the day-to-day operation of a store's fast-paced environment.

Enhancing a shopper's experience in a store and establishing faster methods of check-out are laudable goals. However, the high cost of such systems and their impact on a store's bottom line has been greatly overlooked by the prior art. In the grocery industry, in particular, profit margins are thin (e.g., often no more than 2% of total store sales) and are highly susceptible to fluctuations in rising fuel costs, commodity costs, labor costs and many other costs related to daily operations. Such fluctuations can raise incremental store costs in expected and unexpected ways.

As a result of its thin profit margins, the grocery industry, by and large, continually works to contain its operational costs; i.e., the daily costs to keep open and maintain a store. Controlling operational costs for a grocery store is important and bears directly upon either the size of its profit margin, increased costs to its customers or both. The prior art scantily, if at all, addresses this issue.

For example, Coveley (U.S. Pat. No. 6,725,206) describes the combination of a shopping cart that weighs items placed therein and a handheld device to which the shopping cart communicates this weight information. Coveley does not provide an in-store wireless network. Instead, Coveley conducts financial transactions wirelessly from the handheld device out beyond the physical limits of the store. Like most executions of this type, Coveley's cashier-less shopping store requires a handheld device of vast complexity, cost and sophistication to perform complex technological functions. Coveley's handheld device is a highly expensive solution which costs are borne by the store itself and potentially passed onto store shoppers. While potentially convenient to a shopper, such an execution as Coveley's adds significant capital costs, replacement costs, maintenance costs, increased insurance costs, and others to the daily operational costs of a store.

Schkolnick, et al. (U.S. Pat. No. 6,032,127) provides an "intelligent" shopping cart that uses radio frequency (RF) fields created within the shopping cart that can identify items placed within the shopping cart by the RF tags of items so equipped. Like Coveley, Schkolnick provides a highly sophisticated, complex and expensive way to identify and catalog items placed within a shopping cart. The shopping cart is equipped with a cart computer, computer programs and cart memory. These additions to a shopping cart can cause the cost per cart to rise dramatically in comparison to shopping carts not so equipped. As a result replacement costs and maintenance costs may sky rocket and directly, negatively impact a store's profit margin.

Yoshihisa (JP Application No. 01130949) provides a process that allows a customer to register articles by a scanner fixed to a cart, transmit the registered contents to a host computer through radio waves and then transmit information about the shopping cart's contents to a cash register. The shopping cart comprises a scale that weighs items placed therein. The shopping cart records and retains the weight information until check-out when it is compared to an expected weight based upon the items scanned into the cart.

As has been noted hereinabove, a myriad of attempts to create a shopper-friendly, enjoyable and speedy shopping experience have been tried. However, a cursory review of one's favorite grocery store readily affirms that few, if any, of these attempts have received any large scale use or application in the United States or worldwide. The impediments to the implementation of these attempts are several. First, per unit cost of each handheld device of the prior art are quite high, ranging in price from between several hundred dollars to as high as one-thousand dollars or more. Such costs bear directly upon a store's profitability, its prices to customers or both. As mentioned, this is due to the highly sophisticated components, software, and programming expertise used to construct these handheld devices. Such high-cost devices are also highly susceptible to theft and therefore high insurance and replacement costs can ensue.

In addition, at several hundred dollars or more per unit and per store deployment of the handheld devices ranging from several dozen to several hundred, initial entry costs for use of the handheld devices can be staggering. These initial costs can either reduce a store's profit margins, increase store costs directly to a shopper (i.e., through cost pass-through) or both.

Another impediment to implementation is the replacement costs of the handheld devices due to either theft or damage. Initial costs notwithstanding, replacement costs for the use of the handheld devices described herein can be as costly over time as their initial introduction by the hundreds, thousands or even tens of thousands across a retail chain and in particular a grocery store chain. Additionally, given the complexity of the handheld devices described hereinabove, technical support for the handheld devices and technologically complex shopping carts would be required and therefore could add significantly to overall store operational costs.

Similarly, the shopping carts described in the prior art and hereinabove can be cost prohibitive too. They are, as has been noted herein concerning the handheld devices, highly complex, comprise expensive components, have high replacement costs and can be expensive to use and maintain. Given that a certain percentage of shopping carts from nearly every store disappears each year without recovery, it is a virtual guarantee that higher replacement costs per store for such shopping carts will serve to either erode a store's profits or erode that store's customer base as higher grocery prices are passed onto its customers.

What is therefore needed is a low cost, highly effective, highly reliable shopping method for a shopper that serves to enhance, simplify and expedite a shopper's experience with very little, if any, cost pass-through by higher store prices due to expensive end-user components and very little, if any, negative impact to a store's profit margin. This has been achieved through one or more of the embodiments enclosed hereinbelow and will now be explained with greater detail and particularity.

BRIEF DESCRIPTION OF THE INVENTION

Provided herein is a method for shopping in a store. A method for enabling a shopper to shop in a store that has purchasable items comprises
A) Providing
  1) Scan readable media approximate to the purchasable items;
  2) A wireless end device;
  3) A central computer; and
  4) A communications multi-network having
    a) A mesh communication network for tracking a location of the wireless end device throughout a store; and
    b) A star communication network for transfer of data from the central computer to the wireless end device and from the wireless end device to the central computer;
B) Connecting the central computer operatively to the communications multi-network;
C) Positioning the wireless end device in close proximity to the shopper, the wireless end device being positioned to travel with the shopper through the store;
D) Scanning the readable media on the purchasable items, the scanning producing scanning data;
E) Transmitting the scanning data through the star communication network of the communications multi-network to the central computer;
F) Updating the location of the wireless end device through the mesh communication network to the central computer, the updating producing location tracking data; and
G) Transmitting the location tracking data through the mesh communication network of the communications multi-network to the central computer, the central computer operating to continually update the shopper's position based on the location tracking data received by the central computer.

Herein, a shopper's location or presumed location in a store may be tracked continuously or substantially continuously by tracking the location of a shopper's wireless end device and/or shopping cart used by a shopper in a store.

In one embodiment herein, the multi-network comprises at least one mesh communication network and at least one star communication network. Working together, though not necessarily dependently, the mesh communication network and the star communication network enable a shopper to communicate with a store to transmit information and receive information through the multi-network and to transmit and receive information about a shopper's presumed whereabouts in a store. In another embodiment herein, the multi-network may comprise two or more star communication networks positioned about the store by themselves or in addition to one or more mesh communication networks in a store.

The preferred mesh communication and star communication networks comprise a ZIGBEE network which operates, generally, within the IEEE 802.15 communications protocol, and more preferably within the IEEE 802.15.4 communications protocol. The ZIGBEE network preferred herein is particularly useful and helpful in providing a location function through use of the multi-network.

In practice, a shopper communicates wirelessly through the multi-network via a wireless end device. The wireless end device communicates wirelessly through the mesh communication network and the star communication network or through the two or more star communication networks. The multi-network preferably comprises a central computer that routes, manages and, in one alternative embodiment herein, store information transmitted through the multi-network. In one embodiment herein substantially all of the computational functions performed are done within the multi-network by the central computer or some other device with computational functionality not including the wireless end device as directed by the central computer. In another embodiment herein at least a portion of the computational functions may be performed by the wireless handheld device, and in particular those functions necessary for tracking and locationing.

In the multi-network, real-time location data is gathered by one or more mesh communication networks. Real-time communication of data is performed by one or more star communication networks. This multi-network embodiment provides a superior use of resources, as smaller packets of data (x and y coordinates for location tracking) are transmitted on the low energy, cost-effective mesh communication network while larger packets of data (e.g., voice, image, and encrypted data) are transmitted over the faster and wider-banded star communication network.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements and in which:

DETAILED DESCRIPTION OF THE SPECIFICATION

Figure 1:
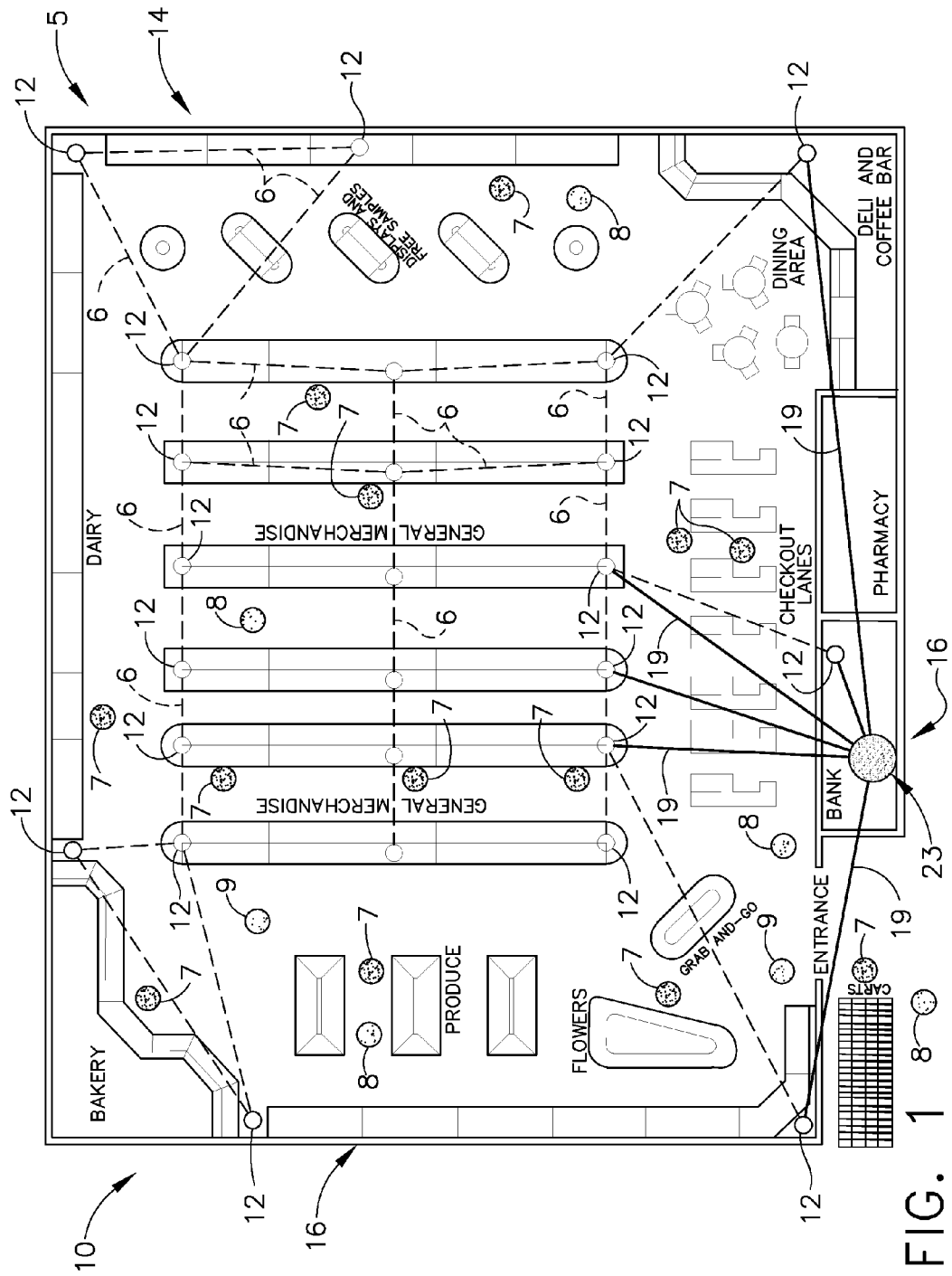
FIG. 1 is a schematic plan view of a store having a preferred store-based multi-network for communication.

By the term "store" it is meant herein all manner of retail environments in which the purchase of goods occurs and in which shoppers are physically present in a store to purchase such goods including, but not limited to store types like grocery stores, convenience stores, clothing stores, consumer goods stores, specialty stores, manufacturing facilities, warehouses, and many other retail store types.

By the term "grocery store" it is meant herein the kind of store in which all manner of food, produce, floral products, pharmaceutical products, and traditional grocery products and/or services are offered within a shopping venue.

By the term "multi-network" it is meant herein a communications network in a store comprising two or more dissimilar types of communication network types, two or more similar types of communication networks or some combination thereof.

By the term "store based multi-network" it is meant herein that most, if not all, of the necessary wireless communications between shoppers and a store occur within the store itself, upon the store's premises and/or within the boundary controlled by the store (e.g., the store parking lot).

By the term "weight information" it is meant herein all information related to weight that is recorded by the method herein for items placed within a shopping cart whether that information is for an individual item or whether that information is for an aggregate of items placed within a shopping cart of the type described in detail herein.

By the term "computational functions" it is meant herein any and all microprocessor or microcontroller based computational tasks or routines commonly known in the art to occur in a computer or computer-like device that comprises software, memory, and a processor.

The term "computational work" as used herein means those types of common computations associated with known computer and/or server types of devices having switches, complex microcontrollers and/or central processing units (CPUs). Such devices performing computational work typically have the capacity to carry extensive software and execute many various types of routines and sub-routines therein.

The term "mesh network organizer" as used herein means a radio within the mesh communication network of the multi-network. The mesh network organizer routes information, also known as packets or data, to and from information routers and the central store computer. In one embodiment, the mesh network organizer routes location tracking data to and from information routers and the central store computer. In one embodiment the mesh network organizer transmits data through an Ethernet cable to the central computer. Functionally, the mesh network organizer routes location tracking data of the store associate's wireless end devices and the shopper's wireless end devices to one or more store managers herein.

By the term "radio" it is meant herein a device for wirelessly communicating onto a wireless network like a mesh communication network or a star communication network herein.

The term "data communications radio" as used herein means a radio within the star communication network of the multi-network. The data communications radio as used herein means a hub node, also known as a central node, of a star communication network of a store's multi-network herein. The data communications radio routes data information, also known as packets or data, to and from wireless end devices and the central store computer. The data communications radio routes data information, also known as packets or data, to and from manager's devices and the central store computer. In one embodiment the data communications radio transmits data through an Ethernet cable to the central computer. Functionally, the data communications radio routes data, such as barcodes from the store associate's wireless end devices and shopper's wireless end devices, to managers. Because the data communications radio is a radio, it broadcasts or radiates out radio waves to other members of the star communication network.

The terms "information routers" and "stationary node" and "stationary reference node" are used interchangeably throughout this application means devices within the multi-network that receive and send information through the multi-network to and from wireless end devices, a central computer and others.

The term "dual network router" as used herein means a device which houses at least three MCU radios, at least one such radio that functions as the information router for the mesh communication network, one radio that functions as the data communications radio for the star communication network and a third radio that controls the routing of information to and from the other two radios. Two of the at least three radios, may be Texas Instruments Models 2430 or 2431, but the third should preferably be a controller with greater power, such as the Texas Instruments Models above the 243x series.

The term "gateway server" as used herein means a server that is receiving data from the multi-network of the store through a switch that is being routed by the gateway server to other store servers like a point of sale server in a store.

The term "central computer" is meant herein as an electronic device comprising a switch and a server or other electronic device capable or performing the functions of the switch, gateway server and store computers, such as an associate task managing server, a computer assisted ordering system computer, a point of sale server, an ISP server or other store computer. The central computer may serve as the store's main database. Functionally the central computer organizes, manages and stores data received from the multi-network. Furthermore the central computer routes data out to other elements of the multi-network such as one or more shopper's wireless end devices, one or more associate's wireless end devices or to a manager's device.

The term "wireless end device" means herein a device used by a shopper (and alternatively a store associate or store manager) useful for shopping for items in a store by scanning such items with the wireless end device thereby noting the identity of each item at a store shelf intended for purchase by a shopper. As used herein each wireless end device may be termed as a blind node within a multi-network for location tracking purposes. The wireless end device is also an end node within a multi-network.

The term "blind node" as used herein is a wireless end device, and is a term used to describe the wireless end device during the location tracking operation of the multi-network.

The term "location tracking device" as used herein means a device containing a location detection hardware module that can be used to receive signals from stationary nodes (herein, routers) that have known locations within a multi-network or store's multi-network. Preferably, location tracking devices disclosed herein have the means of performing ray tracing calculations and blind node location calculations to determine its own location in relation to stationary reference nodes.

Provided herein is a method for enabling a shopper to shop in a store that has purchasable items comprises, A) Providing
 1) Scan readable media approximate to the purchasable items;
 2) A wireless end device;
 3) A central computer; and
 4) A communications multi-network having
  a) A mesh communication network for tracking a location of the wireless end device throughout a store; and
  b) A star communication network for transfer of data from the central computer to the wireless end device and from the wireless end device to the central computer;

B) Connecting the central computer operatively to the communications multi-network;

C) Positioning the wireless end device in close proximity to the shopper, the wireless end device being positioned to travel with the shopper through the store;

D) Scanning the readable media on the purchasable items, the scanning producing scanning data;

E) Transmitting the scanning data through the star communication network of the communications multi-network to the central computer;

F) Updating the location of the wireless end device through the mesh communication network to the central computer, the updating producing location tracking data; and G) Transmitting the location tracking data through the mesh communication network of the communications multi-network to the central computer, the central computer operating to continually update the shopper's position based on the location tracking data received by the central computer.

In one embodiment herein, the multi-network comprises at least one mesh communication network and at least one star communication network, each being positioned about a store to form a multi-network. Working together, though not necessarily dependently, the mesh communications network and the star communication network enable store-to-shopper and shopper-to-store communication through the multi-network. In another embodiment herein, multiple mesh and/or star communication networks may be used.

Figure 2:
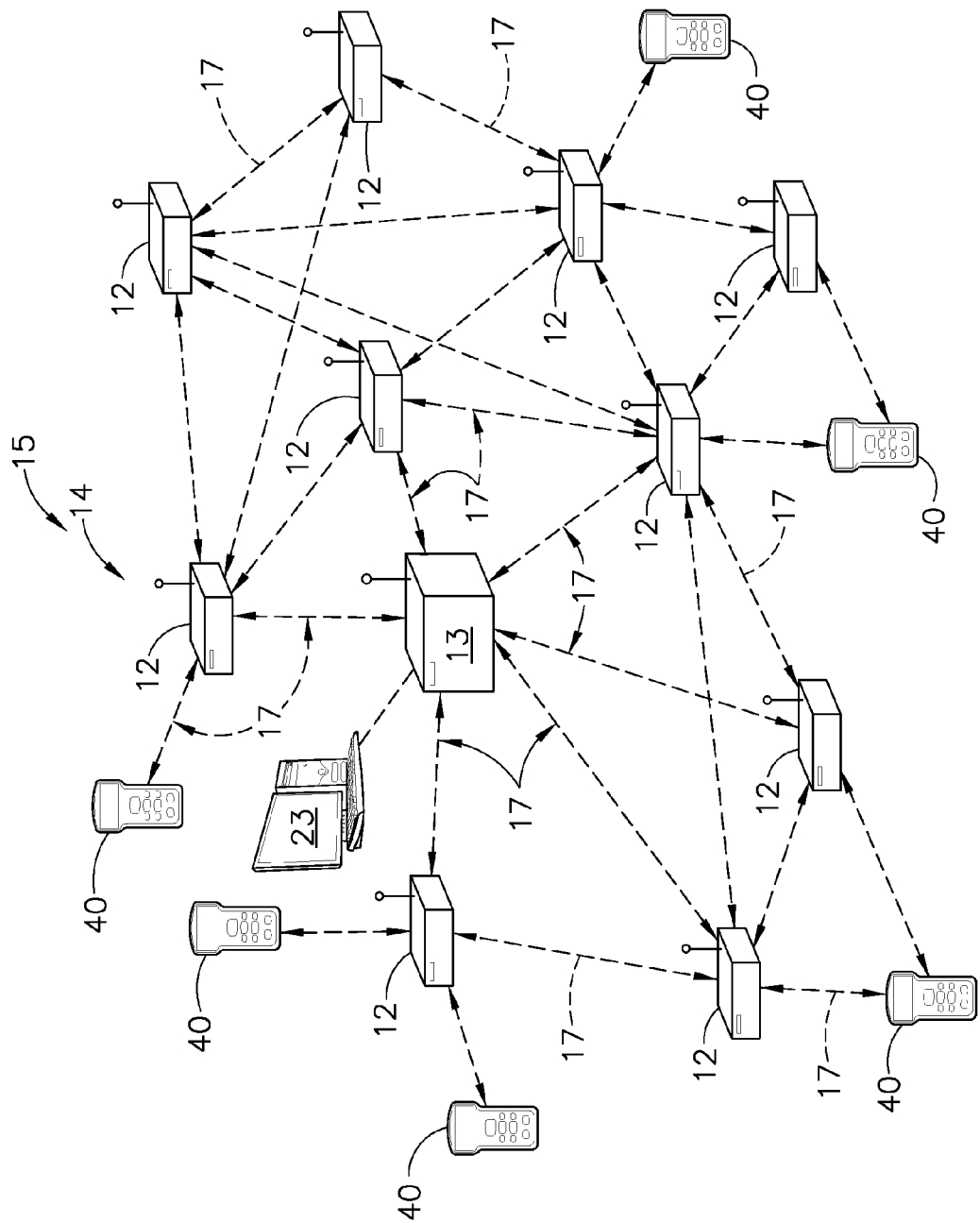
FIG. 2 provide a schematic view of an exemplary mesh communication network useful in a store.
Figure 3A:
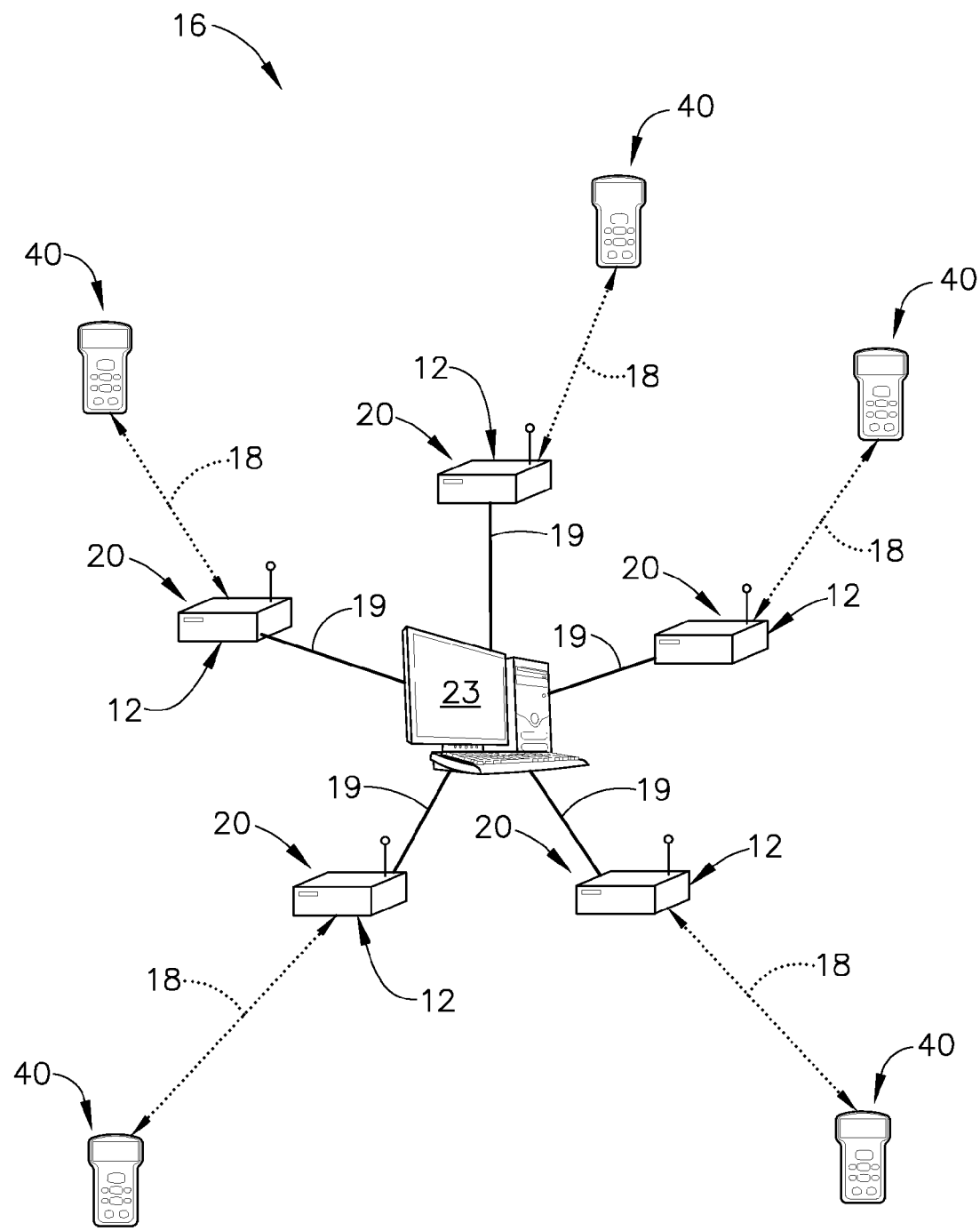
FIGS. 3A and 3B provide a schematic view of an exemplary star communication network useful in a store.

FIG. 1 provides a schematic plan view of a store 5 having a store-based multi-network for wireless communications. In particular, FIG. 1 shows a top view of a section of store 5 in which multi-network 10 may be positioned within and about store 5 and the store's premises (e.g., the store's parking lot and other outer areas—not shown). In FIG. 1, multi-network 10 comprises at least one mesh communications network 14 and at least one star communications network 16. For greatest clarity, exemplary connections between routers 12 for both mesh communications network 14 and star communications network 16 are shown in FIGS. 2 and 3A herein, respectively. Multi-network routers 12 or "routers" 12 are shown located about store 5 and are important components of multi-network 10.

In the selected embodiment, mesh communication network 14 is used for determining the location of members of the mesh communication network 14 and the star communication network 16 is used for communicating non-locationing data like voice, image and scanned product data. In this embodiment, the star communication networks 16 are used to transmit all non-locationing data directly to the gateway server 27 (see FIG. 3B). Central computer 23 may transmit the non-locationing data to stores servers 29, 30 or 31 and routes any response back through the star communication network 16 to the appropriate shopper 7, associate 8 or manager 9 as shown in FIG. 1.

In this embodiment star communication network 16 and the mesh communication network 14 are entirely separate networks with a common network switch 25 to central computer 23 and store servers, 29, 30 and 31. Also in this embodiment, shoppers 7 shop using wireless end devices 40. They communicate to the point of sale server 30 through star communication network 16, while their location (i.e., a shopper's presumed location) is tracked using the mesh communication network 14.

Within multi-network 14 a data network organizer 13 exists that assigns addresses to all members of the mesh communication network 14 (FIG. 2A). The data network organizer 13 is the single point of entry to the mesh communication network 14 to and from central computer 23. Moreover, reference nodes, also known as information routers 12, are fixed members of the mesh communication network 14.

Each information router 12 transmits Received Signal Strength Indication (RSSI), x and y coordinates belonging to the position of the information router 12 and the address of the its closes star data network to any requesting wireless end device 40 belonging to a shopper 7, associate 8 or manager 9.

All communications from both the mesh communication network 14 and the star communication network 16 go to central computer 23. Central computer 23 records and may store (or have stored) location information and routes messages, based on the message identification, to the appropriate store server, 29, 30 or 31. Preferably, the store servers can only communicate to the wireless end devices through central computer 23.

FIG. 1 shows multi-network 10 wherein mesh communication network 14 and star communication network 16 each use multi-network router 12 located about store 5. Thus, each multi-network router 12 preferably contains the components for transmission of data through mesh communication network 14 and star communication network 16.

In selected embodiments, each multi-network router 12 is placed in a location that is out of reach of persons shopping or working in store 5. A preferred area of placement for each multi-network router 12 is close to or in the ceiling of store 5. Preferably, though not necessarily, each multi-network router 12 houses at least three radios. One radio serves the mesh communication network 14. Another radio serves star communication network 16. A third radio (or more) serve to route data through the radios for mesh communication and star communication networks, respectively.

In FIG. 1, multi-network communication lines 19 are shown connecting each multi-network router 12 to central computer 23. Multi-network communication lines 19 may be either wireless or wired. Preferably, multi-network communication lines 19 are wired and are shown with solid lines to indicate that they are wired in FIG. 1 and some subsequent figures herein. Ethernet cable is the preferred wired connection device between each multi-network router 12 and central computer 23.

Also shown are multi-network communication lines 6 that correspond to zones of transmission between multi-network router 12 within mesh communication network 14. In practice, multi-network communication lines 6, though represented as straight lines for purposes of illustration, are not necessarily straight lines, but more accurately operate as circular zones of transmission emanating from each multi-network router 12. Through such zones of each dual network router 12, data is transmitted and received.

As noted hereinabove, each multi-network router 12 preferably operates for both mesh communication network 14 and star communication network 16. Within router 12, therefore, are the necessary components to operate a preferred router 12 for mesh communication network 14 and star communication network 16. Router 12 comprises at least two microcontroller units (MCUs). One MCU is used for mesh communication network 14 and another is used for star communication network 16. Each MCU herein is preferably a system-on-a-chip type of MCU and comprises a control unit, one or more registers, an amount of ROM, an amount of RAM and an arithmetic logic unit (ALU). The Texas Instruments CC2431 MCU is an exemplary and preferred MCU for use herein because of its ability to be used to readily transmit data through mesh communication network 14 and star communication network 16 at prescribed data transmission rates. Also the CC2431 MCU can provide location detection functions within multi-network 10 herein.

In addition to the at least two MCUs used for information flow and management along mesh communication network 14 and star communication network 16, at least one governing MCU is employed within multi-network router 12. This additional MCU is a governing MCU in that it governs, evaluates, sends messages to, receives information from and manages the other MCUs (e.g., the CC2431 microcontroller) configured to send and receive locationing information along mesh communication network 14 and data (e.g., scanned product information) along star communication network 16.

An exemplary type of MCU used for the above-noted governing functions is the Texas Instruments microcontroller model number MSP430. The MSP430 is a microcontroller built around a 16-bit processor that is designed for low cost and low power consumption embedded applications. It is particularly well suited for wireless radio frequency or battery powered applications. The current draw in idle mode can be less than 1 microampere. Its top processor speed is 16 MHz. It can be throttled back for lower power consumption.

Depending upon system requirements, the MSP430 MCU may be equipped with an external memory bus (e.g., when wireless end device 40 is a full function device) or it may not have an external memory bus (e.g., when wireless end device 40 is a reduced function device). Regardless of either execution, the MSP430 MCU will preferably comprise some on-chip memory having up to 128 KB flash memory and 10 KB RAM).

Figure 6:
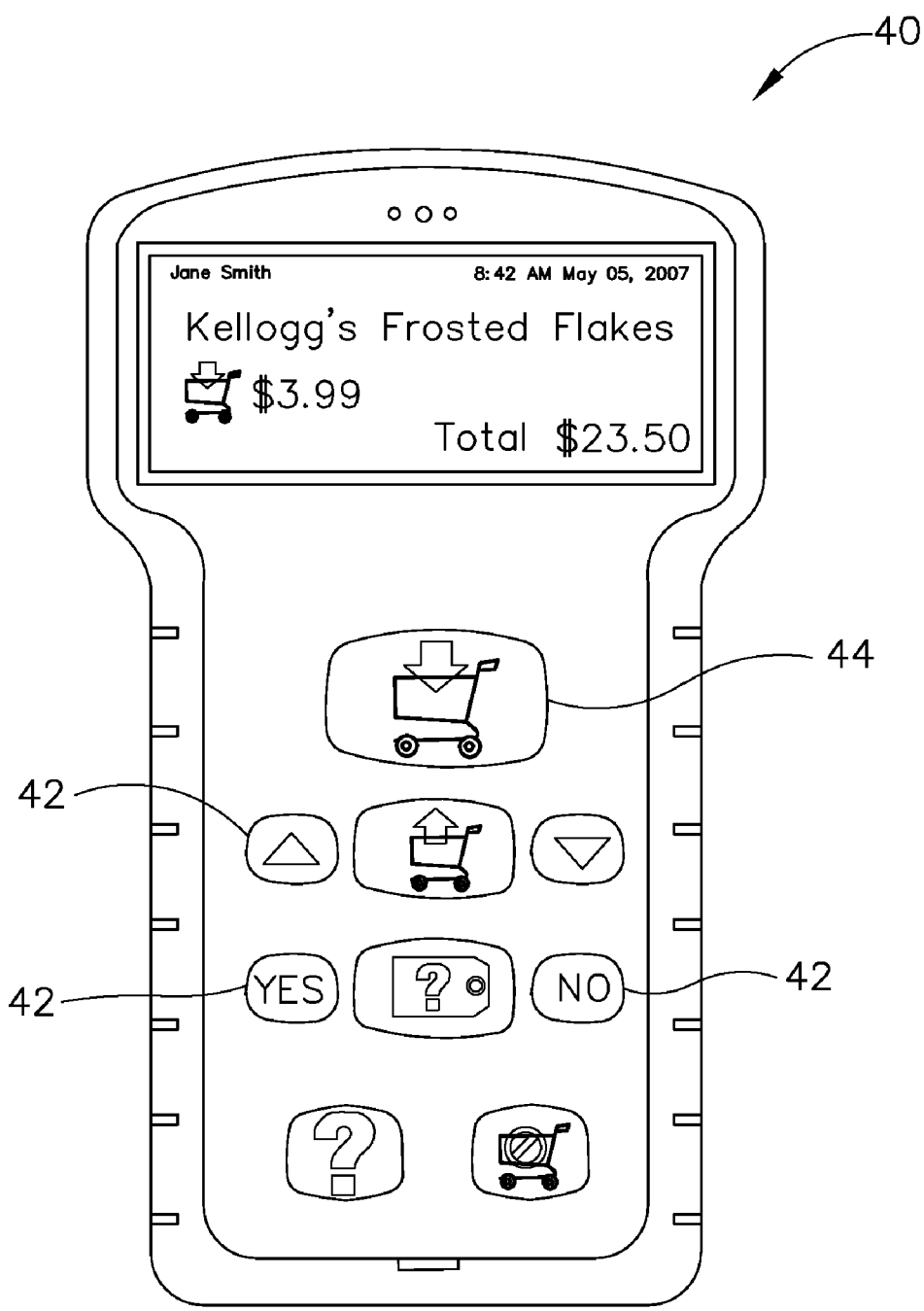
FIG. 6 shows a face view of a wireless end device used by a shopper.

In practice, the data transmission rate within mesh communications network 14 is preferably configured to be at least 125 kilobytes per second (KB/s). The data transmission rate within star communication network 16 is preferably configured to be at least 250 KB/s. The interface between shopper 7 and multi-network 10 is wireless and is accessed by shopper 7 through wireless end device 40 (FIG. 6).

FIG. 2 provides a schematic representation of an exemplary mesh communication network 14 for use in the invention herein. Provided are multiple multi-network routers 12 that are in wireless communication with wireless end devices 40 and a data network organizer 13 along mesh communication lines 17. Mesh communication lines 17 are not actual lines, but are meant to portray the direction and existence of wireless lines of communication between the information routers 12 that make up the mesh communication network 14 and other components like the one or more wireless end devices 40 and mesh network organizer 13. The mesh network organizer 13 is connected to central computer 23 along multi-network communication lines 19 (shown in FIG. 1 and subsequent other figures). Multi-network communication lines 19 are preferably wired lines. Mesh communication network 14 provides many benefits including low power consumption, low cost of operation, efficient communication within a defined space and low cost for maintenance.

As is shown in FIG. 2 each multi-network router 12 has the ability to communicate with at least some of the other routers 12 in mesh communication network 14. Preferably, each router 12 is able to communicate with every other router 12, mesh network organizer 13, central computer 23 or wireless end device 40 associated with mesh communication network 14. By the term "associated" it is meant herein a device's (e.g., wireless end device 40) accepted attachment to multi-network 10 for wired and/or wireless communication thereon and therethrough.

Mesh communication network 14 is a local area network (LAN) that may employ one of two connection arrangements. One arrangement is a full mesh topology. Another arrangement is a partial mesh topology. In a full mesh topology, all of the multi-network routers 12 are wirelessly connected to one-another and may receive and transmit information to every other router 12 within the mesh. In a partial mesh topology, each router 12 is wirelessly connected to some but not all of the routers 12 available within the mesh. Herein, the preferred topology of the mesh communication network 14 herein is the full mesh topology type.

Preferably, the data transferred through mesh communication network 14 is limited to small packets of data, such as x and y location coordinates between one or more shoppers 7, store associates 8, or managers 9. Preferably, the location tracking functionality of multi-network 10 is conducted over mesh communication network 14. In this embodiment routers 12 do not necessarily communicate with each other, but instead provide x and y coordinates to each wireless end device 40. In one preferred embodiment herein a wireless end device 40 can calculate its own x and y coordinates through triangulation software loaded onto the wireless end device 40. Alternatively, central computer 23 can calculate the x and y coordinates of a blind node herein (i.e., wireless end device 40) and then forward those x and y coordinates to one or more multi-network routers 12 and/or the relevant wireless end device 40 which location has been calculated Preferred mesh communication network 14 used herein is a ZIGBEE network 15. As is shown in FIG. 2 ZIGBEE network 15 is formed in part by a mesh of routers 12 whereby each router 12 may transmit to and receive transmissions from one or more of the routers 12 within ZIGBEE network 15; i.e., either in a full mesh topology or a partial mesh topology.

ZIGBEE is the name of a specification for a suite of high level communication protocols using small, low-power digital radios based on the IEEE 802.15.4 standard for wireless personal area networks (WPANs). ZIGBEE is targeted at radio frequency (RF) applications that require a low data rate, long battery life, and secure networking The benefits of using ZIGBEE network 15 as the preferred mesh communication network 14 herein are several. ZIGBEE mesh communication networks are known for their low power consumption, low cost of implementation, high density of component use (e.g., the use of dozens, if not hundreds, of multi-network routers 12 and/or wireless end devices 40 for one mesh communication network), and its simple communications protocol. ZIGBEE protocols are intended for use in wireless communication networks requiring low data rates and low power consumption.

ZIGBEE network 15 provides an inexpensive communications network that can be used for industrial control, embedded sensing, medical data collection, smoke and intruder warning, building automation, home automation, and many others. The resulting network uses very small amounts of power which can then allow individual devices to run for up to one year or more using originally installed batteries.

The ZIGBEE protocol operates in the industrial, scientific and medical (ISM) radio bands; i.e., 868 MHz in Europe, 915 MHz in the USA and 2.4 GHz in most other jurisdictions worldwide. ZIGBEE technology is intended to be simple, inexpensive and readily maintainable. In one execution, the most capable information router 12 within ZIGBEE network 15 may require only about 10% of the software of a typical BLUETOOTH or other wireless internet node though a BLUETOOTH execution is also contemplated herein. In another execution, information router 12 may only contain about 2% of the software of a typical BLUETOOTH or other wireless internet node for use within ZIGBEE network 15 thus greatly reducing technical complexity and potential maintenance costs.

In its simplest form, ZIGBEE network 15 herein comprises one or more information routers 12, at least one data network organizer 13, and one or more wireless end devices 40 of the type shown in FIG. 2. Data network organizer 13 is a device that routes data through one or more of information routers 12 within ZIGBEE network 15. Data network organizer 13 is connected to central computer 23 through a multi-network communications line 19. In a non-beacon type of ZIGBEE network 15, when asked by the wireless end devices 40, the data network organizer 13 transmits a signal through the one or more multi-network routers 12 back to the wireless end devices 40. Central computer 23 manages routers 12, causes association of the wireless end devices 40 to the ZIGBEE network 15, stores router 12 information and routes messages between routers 12 and wireless end devices 40.

Central computer 23 or, in alternative embodiments, wireless end device 40 provides several important functions within mesh communication network 14 and ZIGBEE network 15 in particular. Important functions provided by central computer 23 are those of computation, information storage, organization, response, network notification, data prioritization, event prioritization, data transfer to other storage and/or computational devices and others. Important functions provided by wireless end device 40 are those of computation, information storage, organization, response, network notification, data prioritization, event prioritization and others. A server or server grade computer is particularly useful in multi-network 10 herein in function as central computer 23 because of its typically large computational and storage capacities. It is contemplated herein that more than one server-grade computer may be used to form the composite functions of central computer 23, and that it does not have to be relegated to one or more types of computational devices.

ZIGBEE network 15 may either be of the non-beacon type or the beacon type. In a non-beacon enabled network (i.e., those whose beacon order is 15), multi-network routers 12 have data receivers that are preferably continuously active. The non-beacon enabled type of ZIGBEE network 15 allows for heterogeneous networks of multiple device types in which some devices receive continuously, while others only transmit when an external stimulus is detected.

A known example of an element within a heterogeneous network is a lamp having a wireless light switch. The ZIGBEE node at the lamp receives constantly, since it is connected to the lamp's power supply while a battery-powered light switch remains "asleep" or inactive until the light switch is thrown. The light switch then activates, sends a command to the lamp, receives an acknowledgment, and returns to a state of inactivation. In a beacon enabled network, information routers 12 within ZIGBEE network 15 transmit periodic beacons to confirm their presence to other network nodes. Such nodes may sleep between beacons, thus lowering their duty cycle and extending their battery life.

In general, ZIGBEE network 15 minimizes the time that a given multi-network router 12 is on, thereby minimizing its power use. In beaconing networks, router 12 only needs to be active while a beacon is being transmitted. In non-beacon enabled networks, power consumption can be higher since at least some of the routers 12 within multi-network 10 are always active, while some others may be inactive. It is possible, though, to have all or substantially all routers 12 within multi-network 10 continuously active. To preserve power, a beaconing type of ZIGBEE communications network is preferred for a store 5 or grocery store as described herein.

FIG. 3A provides a representation of star communication network 16. Herein, data communication radios 20, whether housed in their own devices or housed with the multi-network routers 12, do not communicate directly with one-another but instead communicate directly with central computer 23 along multi-network communication lines 19. Multi-network communication lines 19 are preferably wired lines that connect routers 12 to central computer 23. Also herein, star communication lines 18 are not wired lines but are meant to portray wireless lines of communication between routers 12 and wireless end devices 40. Preferred multi-network communication lines 19 for use herein are those of the type suitable for use within an Ethernet physical layer operating within the IEEE 802.3 communications standard. More specifically, this Ethernet cable is preferably of the "twisted pair," RJ45 and CAT-x copper type. Such cable is designed to facilitate digital transmission of voice and data over copper wiring with high quality and at high speeds.

Herein, star communication network 16 is particularly useful and important to multi-network 10. With its data transmission rate of 250 KB/s or more, star communication network 16 is the preferred portion of multi-network 10 that carries data streams that require higher data transmission rates for speed and efficiency. Some of these data types that are most suitably transmitted through star communication network 16 in place of or in addition to mesh communication network 14 are voice data, pictures, video, financial transaction data, and other data types better suited for a 250 KB/s transmission rate in place of or in addition to a 125 KB/s transmission rate provided by mesh communication network 14. However, it is possible to transmit information or data requiring higher data transmission rates provided by star communication network 16 through mesh communication network 14 if, for example, star communication network 16 becomes disabled.

The preferred star communication network 16 herein operates within the Institute of Electrical and Electronics Engineers (IEEE) 802 communications protocol. IEEE 802 refers to a family of IEEE standards dealing with local area networks and metropolitan area networks. More specifically, the IEEE 802 standards are restricted to networks carrying variable-size data packets. In contrast, in cell-based networks data is transmitted in short, uniformly sized units called cells for use within, for example, cell phones. Though preferred, it is acknowledged herein that star communication network 16 may operate within multiple communication protocols including but not limited to BLUETOOTH (IEEE 802.15.1 and 802.15.2), WIMEDIA (IEEE 802.15.3), WI-FI (IEEE 802.11b), Wi-Fi5 (IEEE 802.11a/HL2) and other wireless protocols.

Within IEEE 802, star communications network 16 preferably transmits data within the IEEE 802.15.4 communications protocol. The IEEE 802.15.4 protocol controls transmissions sent through wireless personal area networks (WPANs). WPANs may include the use of BLUETOOTH technology. The IEEE 802.15.4 communications protocol has a low data rate (e.g., about 125 KB/s) and also allows for long battery life (e.g., battery life for months or even years) in multi-network routers 12 and is known for its very low technical complexity and low power requirements.

Figure 3B:
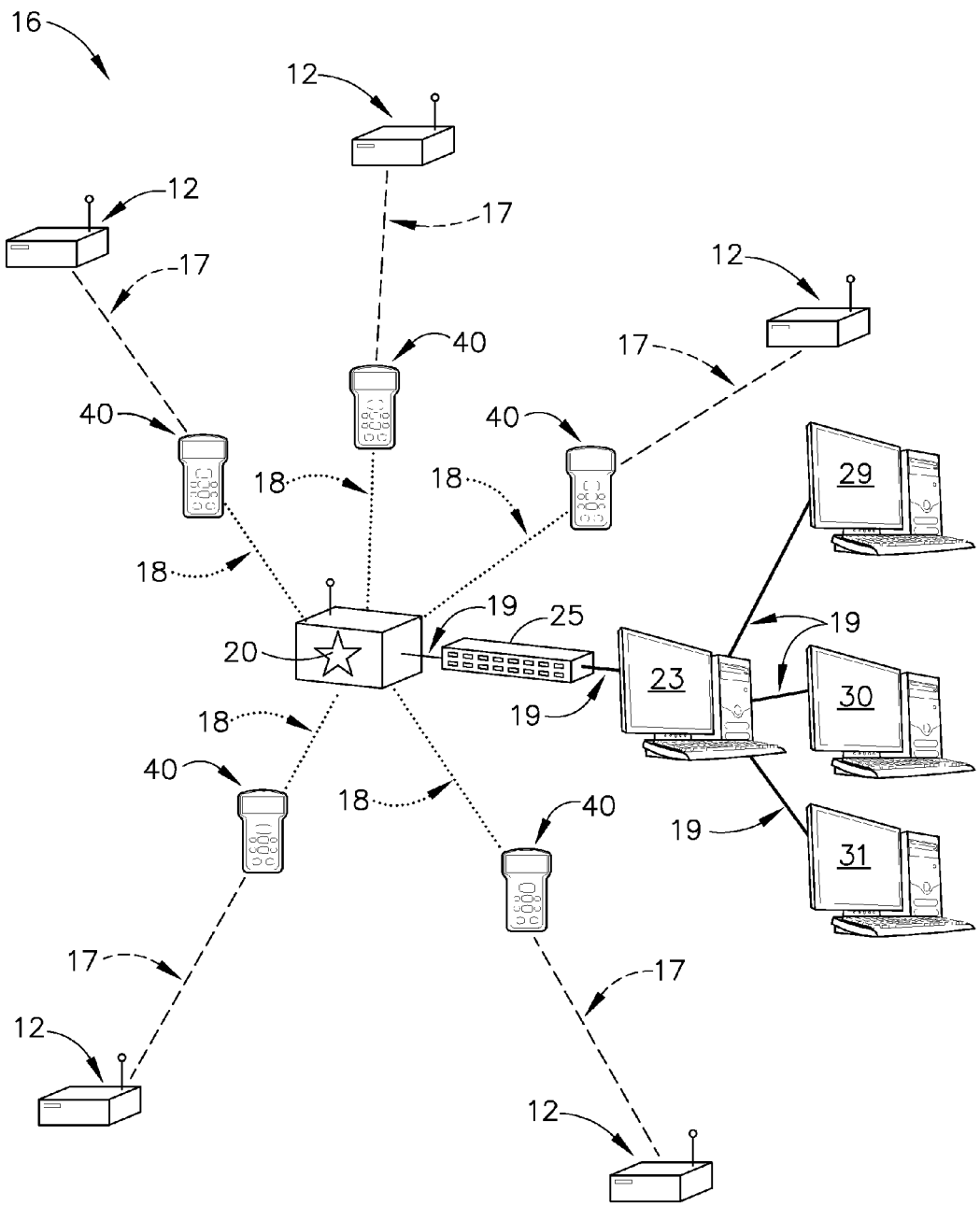

FIG. 3B provides an exemplary representation of a star communication network 16. It shows clearly that multi-network routers 12 of the mesh communication network 14 provide a signal to wireless end devices 40. In the preferred embodiment, routers 12 provide wireless end devices 40 with the x and y coordinates of information routers 12. Wireless end devices 40 either perform the calculations necessary to provide its own location in x and y coordinates or it sends a signal out through star communication network 16 to one of the store servers 27, 29, 30 or 31 to have the calculations done at that level of multi-network 10. Under either scenario, the location of each wireless end device 40 is known to central computer 23 and/or at least one of the store servers (27, 29, 30 and 31) through the data exchanged between wireless end devices 40 and the information routers 12 of the mesh communication network 14.

Figure 4:
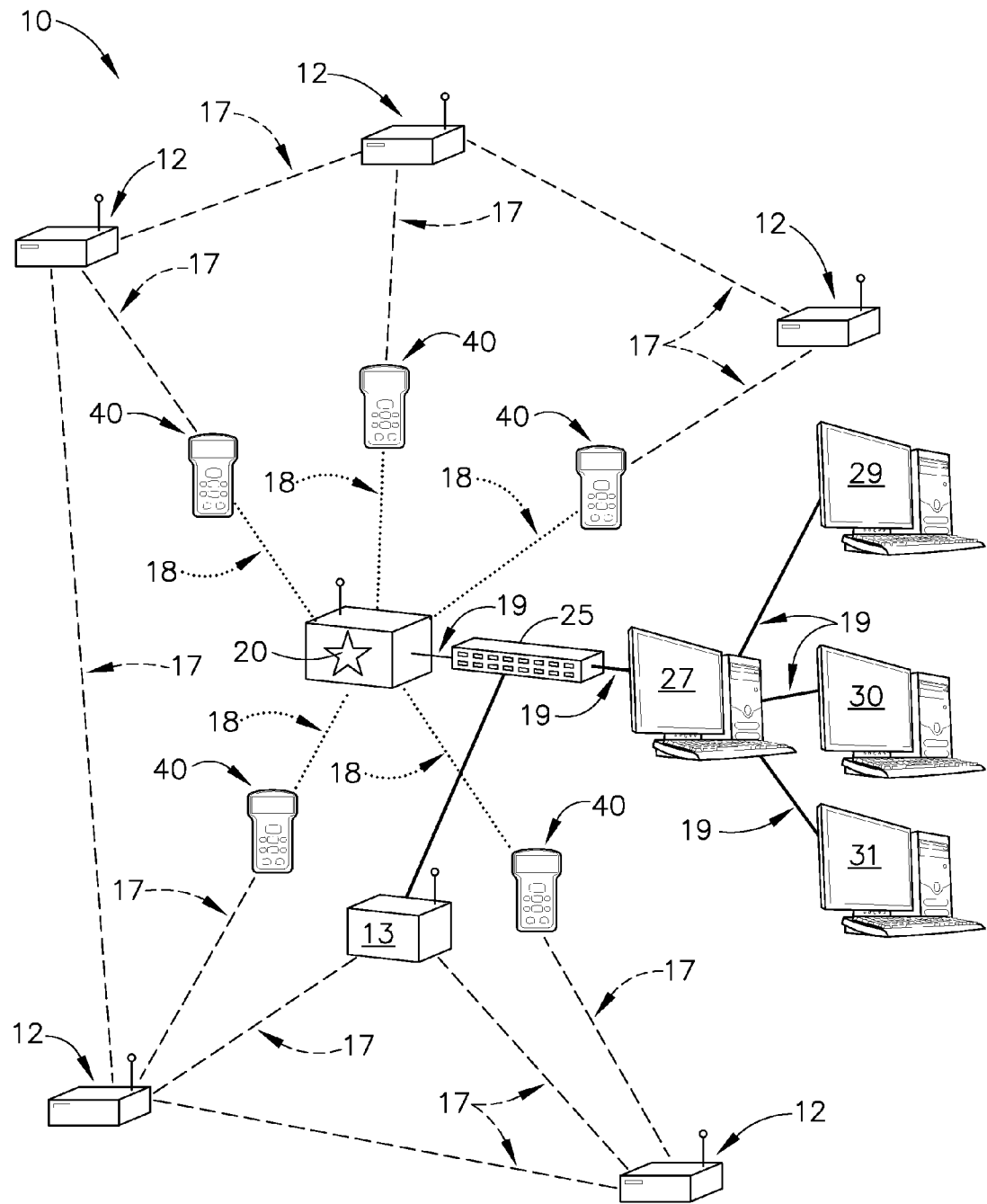
FIG. 4 provides an exemplary representation of a multi-network.

FIG. 4 provides an exemplary representation of multi-network 10. It shows clearly that multi-network routers 12 of the mesh communication network 14 provide a signal to the wireless end devices 40. In the preferred embodiment, routers 12 provide the wireless end devices 40 with the x and y coordinates of routers 12. Wireless end devices 40 either perform the calculations necessary to provide its own location in x and y coordinates or it sends a signal out through star communication network 16 to one of the store servers 27, 29, or 31 capable of performing ray tracing and location tracking calculations. Under either scenario, the location of each wireless end device 40 is known to at least one of store servers (27, 29, 30 and 31) through the data exchanged between wireless end devices 40 and the routers 12 of the mesh communication network 14. In the scenario in which the wireless end device 40 is a reduced function device and one of the store servers (27, 29, 30 or 31) performs the location tracking computations, the nearest information router 12 provides the wireless end device 40 with its own x and y coordinates. U.S. Patent Application Nos. 61/011,125 (Filed Jan. 15, 2008) and 61/065,166 (Filed Feb. 8, 2008) discuss and disclose the preferred methodologies of location tracking herein and are hereby incorporated into this patent application by reference in their entirety.

In practice, the nearest multi-network router 12 to wireless end device 40 receives the x and y coordinates of the wireless end device 40 from the mesh network organizer 13 (FIG. 2), which receives the x and y coordinates from one of the following store servers: 27, 29, 30 or 31. In any event, the location of wireless end device 40 on the map of the store 5 is known to both the wireless end device 40 and at least one of the following store servers 27, 29, 30 or 31, through the mesh communication network 14 of the multi-network 10.

Figure 5:
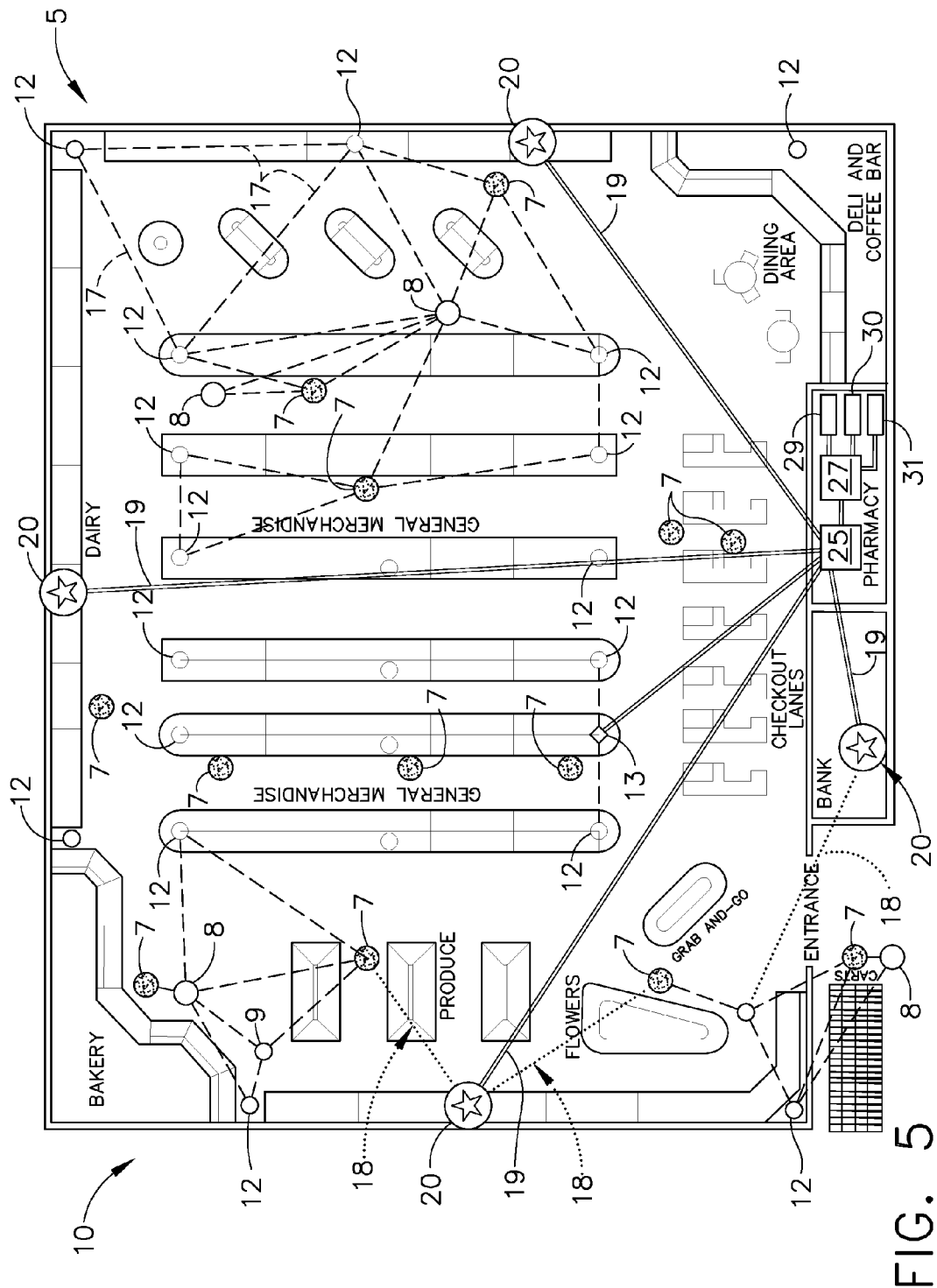
FIG. 5 provides a schematic plan view of a store providing an alternative embodiment of the multi-network.

FIG. 5 provides an alternative embodiment in an exemplary top schematic view of store 5 with multiple star communication networks 16. Also shown in FIG. 5 is mesh communication network 14 in combination with multiple star communication networks 16. Persons of skill in the art will readily recognize that though FIG. 5 shows multiple star communication networks 16 and mesh communication network 14, it is possible to have a multi-network 10 that comprises only multiple star communication networks 16 without the presence of a mesh communication network 14. Taken altogether either the several star communication networks 16 or the several star communication networks 16 and mesh communication network 14 constitute a multi-network 10 as defined hereinabove.

In FIG. 5 as in FIG. 1, mesh communication lines 17 are shown connecting each multi-network router 12 to a mesh network organizer 13 within the mesh communication network 14. Mesh communication lines 17 may be either wireless or wired. Preferably, mesh communication lines 17 are wireless instead of wired. In addition, mesh communication lines 17 exist between routers 12 within mesh communication network 14. In practice, lines of communication 17, though represented as straight lines for purposes of illustration, are not necessarily straight lines. Rather, each router 12 operable within a mesh communication network 14 produces a limited zone of communication through which router 12 to router 12 transmissions occur.

Star communication lines 18 exist between any of shoppers 7, associates 8, and managers 9, and a data communication radio 20, which can function as a hub of star communication network 16. Data communication radio 20 operates as a repository for data transmitted from routers 12. Star communication lines 18 may be either wireless or wired. Preferably, star communication lines 18 are wireless.

Multi-network communication lines 19 are shown connecting data communication radio 20 and central computer 23. Multi-network communication lines 19 are shown connecting data network organizer 13 with central computer 23. Multi-network communication lines 19 may be either wireless or wired. Preferably, multi-network communication lines 19 are wired. Multi-network communication lines 19 are shown with solid lines to indicate that they are wired. Ethernet cable is a preferred wired connection device useful between data communication radio 20 and central computer 23.

For multi-network 10 that contains two or more star communication networks 16, each data communication radio 20 shown for each star communication network 16 is connected through star communication lines 19 to central computer 23 that organizes and manages all elements of multi-network 10 including but not limited to each star communication network 16.

FIG. 6 provides a frontal view of the front surface of wireless end device 40 with multiple interface keys 42. Wireless end device 40 is battery powered and is preferably rechargeable. It has the ability to seek out and associate itself (i.e., attach itself wirelessly) to an existing multi-network 10 herein. Wireless end device 40 may either be a reduced function device or a full function device. Preferably, wireless end device 40 comprises a scanner of the type common to persons of skill in the art that is useful for scanning items by shopper 7 when shopping in a store.

Where wireless end device 40 is a reduced function device it serves substantially as a device that receives and transmits information from multi-network 10. In such a state wireless end device 40 will substantially perform a minimal number of computational functions within wireless end device 40 itself—in this configuration RSSI calculations may still be performed within wireless end device 40. Therefore, the keys shown in FIG. 6 are not meant to imply the actuation of a function within wireless end device 40 other than the receipt or transmission of information from multi-network 10. Instead, such computational functions are meant to occur substantially within multi-network 10 and preferably performed by central computer 23 or similar device attached to multi-network 10 which does not include wireless end device 40.

Each multiple interface key 42 denotes a function that occurs, but in a reduced function device most of the multiple interface keys 42 actually provide a requested transmission to or from multi-network 10. In this instance, wireless end device 40 does not itself substantially compute or keep a running total of the cost of items previously scanned and then placed into shopping cart 50. Instead, cart key 44, when depressed, signals to multi-network 10 that wireless end device 40 is ready to scan an item that is to be placed into shopping cart 50 after the item has been scanned. Information on the item scanned is transmitted wirelessly to multi-network 10 and ultimately routed to central computer 23 for storage and/or further processing.

In preferred practice, central computer 23 keeps a running list of all items scanned by shopper 7, the cost of each item, the weight of each item placed into shopping cart 50 and also totals of all of the items scanned and then placed into shopping cart 50 by shopper 7. Whatever key types are used in a reduced function device herein, substantially no or very little computation work is performed.

It should be noted herein that FIG. 6 is meant to be exemplary and that the types and configurations of the buttons shown or orientation form no part of the invention, and one of skill in the art will readily recognize that a myriad of key types, sizes, shapes, configurations, symbols, graphics can be created to fit within the scope and purpose of wireless end device 40 herein. The fact that multiple interface keys 42 of wireless end device 40 transmit information to multi-network 10 instead of providing some type of computational function is important. By this use of interface keys 42, necessary hardware for computation functions like the totaling of stored item price data is alleviated.

When wireless end device 40 is a reduced function device as described hereinabove, several advantages are achieved. Firstly, wireless end device 40 is extremely cost effective to build and put into use in comparison to other devices known in the art. Secondly, since lower priced components are used (i.e., high speed processor and memory) wireless end device 40 herein is subject to less theft. But, thirdly, even if theft of the wireless end device 40 does occur, its replacement cost is much less than the per unit costs of other more complex devices known in the art. Fourthly, wireless end device 40, which, in a preferred embodiment herein, lacks a high power, high speed processor and memory, also lacks the significant software of some other devices that depend upon one or more high speed processors and large sophisticated memory types. Fifthly, because of the per unit cost of wireless end device 40 many more units can be deployed to more customers for a store like a grocery store which can have hundreds of shoppers per day. Lastly, wireless end device 40 can be used in multiple grocery stores; so long as each store possesses a compatible multi-network 10 usable by wireless end device 40.

If wireless end device 40 is a full function device it has the ability to perform certain complex computational functions, at least partially, within its circuitry, i.e., within its microcontrollers. For example, one function that a full function wireless end device 40 may perform is the storage of information within its memory about store items scanned by wireless end device 40. In practice, wireless end device 40 may catalog each scanned store item, keep a running total of all scanned store items and then provide a financial transaction function once shopper 7 indicates his or her readiness to exit from store 5.

In a full function device, wireless end device 40 contains sufficient processor speed and power to perform certain computational functions and also contains sufficient memory to store information. For this type of wireless end device 40, multiple interface keys 42 located on wireless end device 40 correspond to one or more computational functions that are performed, at least partially, within wireless end device 40 itself. Once one or more computations are performed the results thereof are preferably transmitted through multi-network 10 for storage and/or further processing by central computer 23. In this execution, it is preferred, but not necessary, that central computer 23 acts as a back-up to a full function wireless end device 40 in the case of a computational or other type of outage in wireless end device 40.

Preferred wireless end device 40 herein comprises at least one microcontroller unit (MCU). The MCU herein is preferably a system-on-a-chip type of MCU. The MCU herein comprises a control unit, one or more registers, an amount of ROM, an amount of RAM and an arithmetic logic unit (ALU). In the reduced function type of wireless end device 40, the ALU will be accessed very little, if at all, for any calculations within wireless end device 40. In the full function type of wireless end device 40, the ALU will be accessed and therefore used for computations.

Most preferably, wireless end device 40 comprises at least two MCUs. One MCU is used to receive and transmit information from wireless end device 40 to the mesh communication network 14 (e.g., ZIGBEE network 15). Another of the MCUs is used to receive and transmit information from wireless end device 40 to star communication network 16. An exemplary and preferred MCU for use herein is the Texas Instruments CC2431 MCU.

The Texas Instruments CC2431 MCU is a preferred, though not the only, type of MCU for use herein because of its ability to be used to transmit data for both mesh communication network 14 and star communication network 16. Also, the CC2431 MCU provides location detection functions within multi-network 10 herein. Such location detection is an important, preferred function herein as it allows any device so equipped, whether wireless end devices 40, shopping carts 50 or multi-network routers 12, to be found within and located anywhere within multi-network 10.

The technical specifications for the CC2431 MCU are the following: 32 MHz single-cycle low power 8051 MCU; 2.4 GHz IEEE 802.15.4 compliant radio frequency transceiver, 128 KB in-system programmable flash; ultra low power requirements, ZIGBEE protocol stack (Z-STACK) operable, and 8 Kbyte SRAM, and 4 Kbyte with data retention in all power modes. The CC2431 is a true system-on-chip (SOC) for wireless sensor networking ZIGBEE/IEEE 802.15.4 solutions. The CC2431 includes a location detection hardware module (i.e., the "location engine") that can be used to locate either a wireless end device 40 or a shopping cart 50 within multi-network 10. Based on this the location engine calculates an estimate of an unknown wireless end device's or shopping cart's position within multi-network 10. Such location detection has been discussed at length herein above.

In addition to the at least two MCUs used for locationing and data information flow and management along mesh communication network 14 and star communication network 16, respectively, at least one governing MCU is employed within wireless end device 40. This additional MCU is a governing MCU in that it governs, evaluates, sends messages to, receives information from and manages the other MCUs configured to send and receive information along mesh communication network 14 and star communication network 16.

A preferred type of MCU for the purpose of governing all other MCUs within router 12 is the MSP430 built by Texas Instruments. The MSP430 is a microcontroller built around a 16-bit processor that is designed for low cost and low power consumption embedded applications. It is particularly well suited for wireless radio frequency (RF) or battery powered applications. The current draw in idle mode can be less than 1 microampere. Its top processor speed is 16 MHz. It can be throttled back for lower power consumption. The MSP430 does not have an external memory bus. It is therefore limited to on-chip memory and preferably comprises up to 128 KB flash memory and 10 KB RAM).

In the situation in which multi-network 10 contains multiple star communication networks 16, the preferred configuration of the internal hardware of wireless end device 40 comprises two MCUs responsible for communication with multi-network 10 and an MCU that governs all other needful functions within wireless end device 40. In this configuration one of the two MCUs is always associated with and thereby wirelessly connected to multi-network 10. The other MCU, when it is not wirelessly connected to multi-network 10, searches for the strongest radio signal transmitted by multi-network 10. If a sensed signal by the un-associated MCU becomes stronger than a signal transmitted by the currently associated star communications network 16, the un-associated MCU will convert to associated status and the formerly associated MCU will convert to un-associated status and then begin to seek the strongest radio signal available from multi-network 10. Such process of association and un-association between the MCUs occurs continually as shopper 7 moves about a store 5 and therefore moves from one star communication network 16 to another star communication network 16 located within store 5.

In an alternative embodiment herein in which multi-network 10 comprises multiple star communication networks 16 and no mesh communication networks 14 as exemplified in FIGS. 3A and 3B, two MCUs (preferably Texas Instruments CC2431) responsible for receipt and transmission of information from wireless end device 40 can both be associated to multi-network 10 at the same time. Such a dual association enables the transmission of larger packets of data from or to wireless end device 40. These larger packets of data may include voice data, video and other data types whose wireless transmission (i.e., between wireless end device 40 and multi-network 10) is best facilitated by a 256 KB/s transmission rate or higher.

Figure 7:
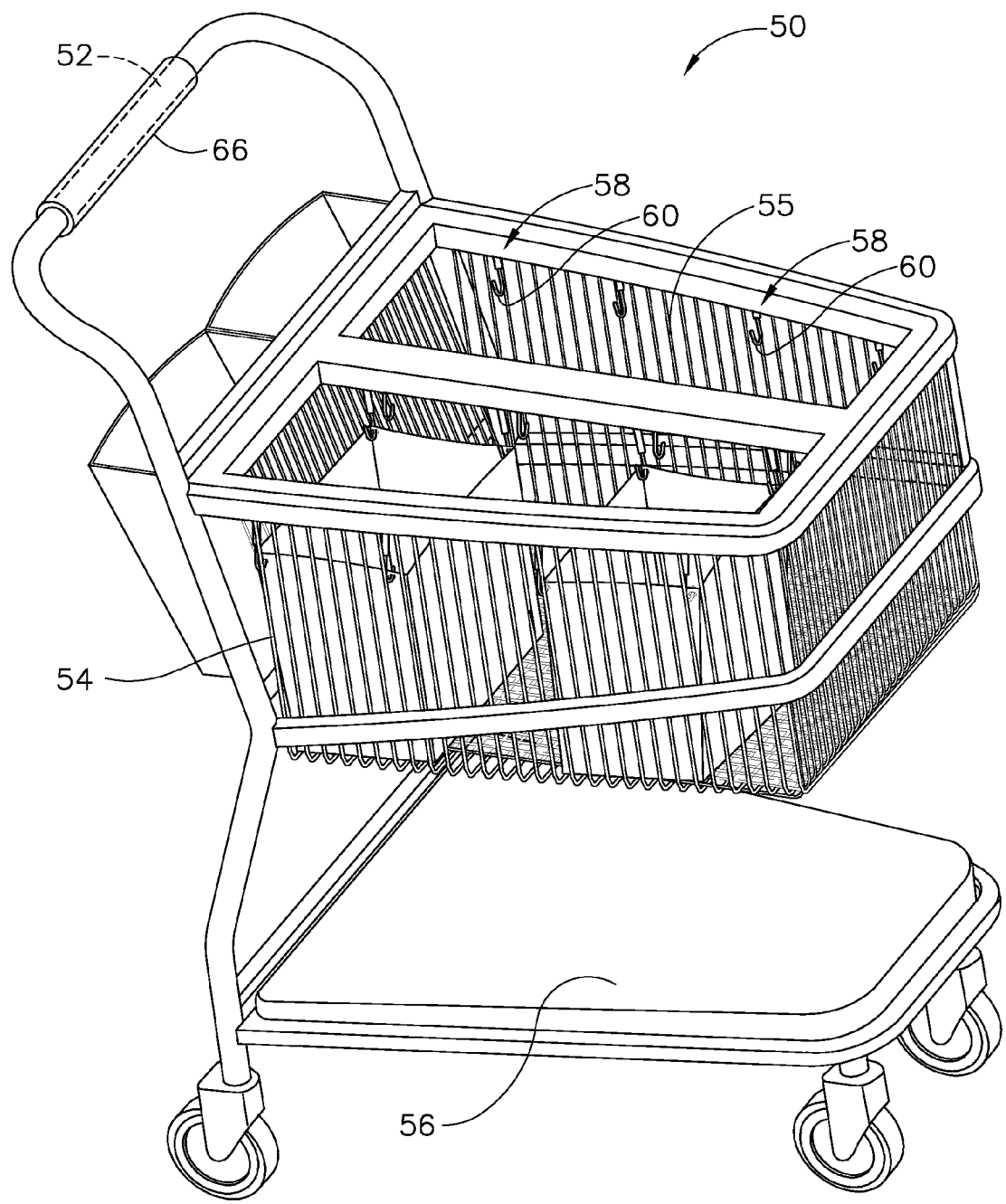
FIG. 7 is an isometric view of a shopping cart of the type preferred herein.
Figure 8:
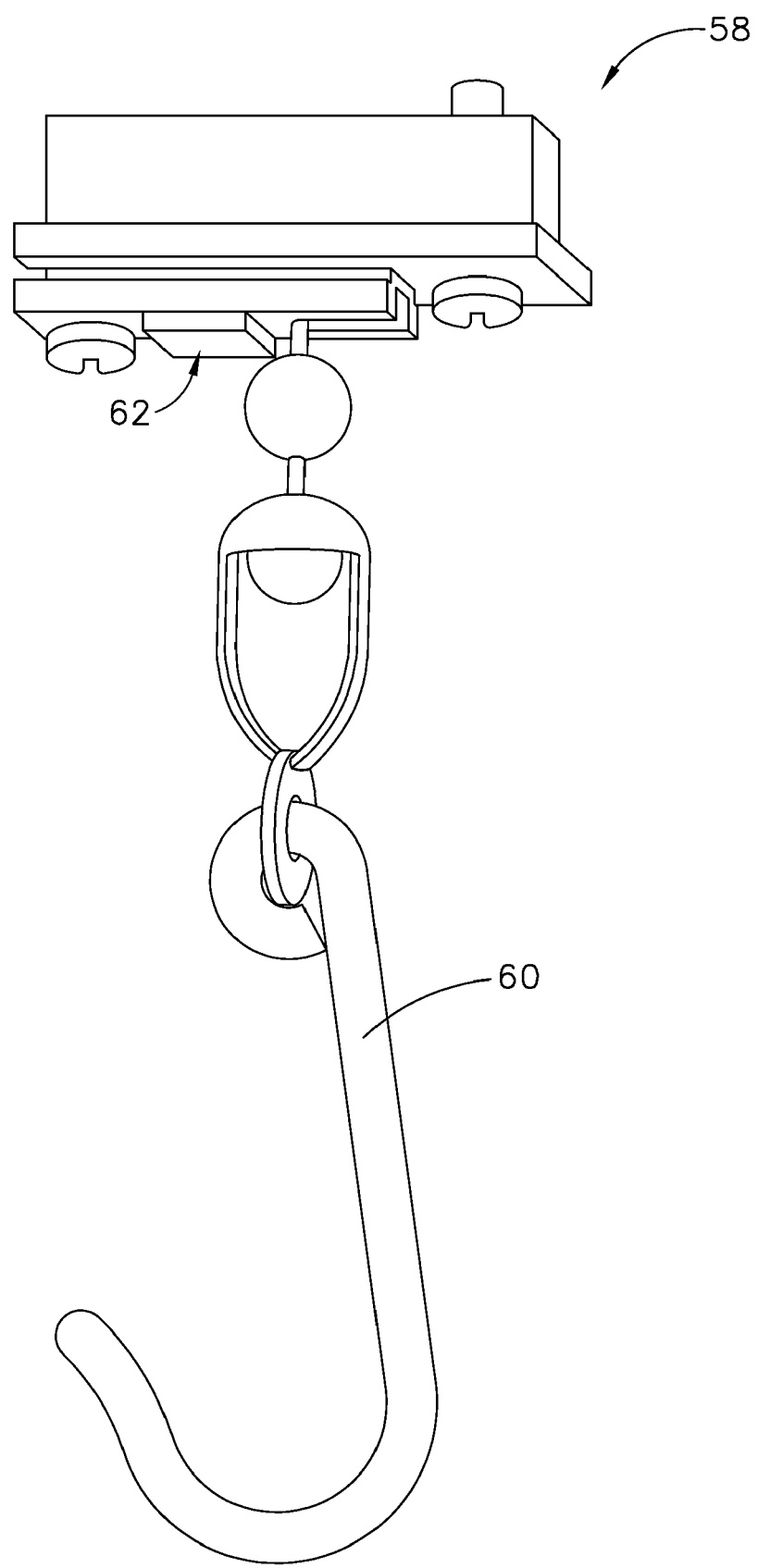
FIG. 8 is an enlarged isometric view of the preferred type of weighing device shown in FIG. 7.

An ideal shopping cart 50 of the type disclosed herein is shown in FIG. 7. The shopping cart 50 has a handle 52, a basket 54 attached to the handle 52 and an under carriage 56 positioned below basket 54. Basket 54 has positioned about its interior surface 55 one or more weighing devices 58. Preferably, at least two weighing devices 58 are positioned within interior surface 55 of shopping cart 50. Also preferably, at least one of the weighing devices 58 is in the form of a hook 60 as shown in FIG. 8. Each weighing device 58 or hook 60 is preferably attached to a strain gauge 62 (FIG. 8) or other strain calculating devices known in the art. In particular, a strain gauge 62 used herein is a device used to measure the deformation or strain of an object upon which it is placed. Strain gauge 62 may be placed on hook 60 by some bonding means like adhesive and is so positioned on the hook 60 as to measure its deformation when hook 60 is put to use; i.e., when an item is placed thereon to cause a measurable deformation.

This measurable deformation is a measure of at least a portion of the weight of an item applied to hook 60. In practice, at least two hooks 60 will be positioned within interior surface 55 of basket 54. Hooks 60 will be so positioned in order to enable a bag 65 or other holding structure to connect to each hook 60 and span the distance therebetween. By the term "bag" as used herein it is meant any suitable container for holding items placed therein for weighing within shopping cart 50 including but not limited to one or more bags, boxes, plastic containers, or other suitable container that can be hung from one or more of the hooks 60. With a bag 65 having items therein hung between two hooks 60, each hook 60 will preferably sense and therefore measure either some or all of the weight within bag 65 by the relative deformation of strain gauge 62 attached to hook 60. However, each hook 60 herein, depending upon the configuration or orientation of a bag 65 hung thereon may sense less than or more than 50% of the weight of items placed within bag 65 that is at least partially hung on one hook 60 and also hung on one or more hooks 60.

As noted hereinabove, the sensed weight per hook 60 may be less or more than fifty percent depending upon an item's position in bag 65 relative to all other items in bag 65, the relative motion of bag 65 and other factors. The total weight of an item placed within bag 65 may be taken from the sum of all of the weights sensed by the applicable hooks 60. By the term "applicable hooks" it is meant herein those hooks 60 in actual use for the weighing of an item sensed by those hooks 60; e.g., those hooks 60 on which a bag 65 is hung.

Once a weighing device 58 herein senses at least a portion of the weight of an item placed therein (e.g., as in a bag or box attached thereto) weighing device 58 may perform at least one of two actions. In one embodiment herein, weighing device 58 will transfer a sensed weight of an item (i.e., in the form of strain gauge deformation data) to a transmissions device 66 (FIG. 7) positioned onto shopping cart 50 that is capable of transmitting information about the sensed weight to multi-network 10. In fact, each of the weighing devices 58 attached to shopping cart 50 is preferably connected to transmissions device 66. Such connection of one or more weighing devices 58 to transmissions device 66 is preferably wired but may also be wireless; persons of skill in the art will recognize that the nature of such connection between one or more weighing devices 58 to transmissions device 66 may be done in a myriad of ways and does not form a material part of the invention herein.

A preferred transmissions device 66 contains one or more transmission devices (e.g., one or more MCUs or radios described hereinabove) that can transmit weight information obtained from one or more strain gauges 62 to multi-network 10. In one embodiment herein, but not necessarily, transmission device 66 may not itself store the weight information sensed and then transmitted by one or more weighing devices 56. Instead, such transmitted weight information is immediately transmitted through multi-network 10 to central computer 23 or to some other storage and/or computational device connected to multi-network 10 as hereinabove described (e.g., servers 29, 30 and 31 in FIG. 3B), such connection being either wireless or wired.

Preferably, transmissions device 66 contains at least one radio configured for transmissions to and from mesh communication network 14, at least one radio configured for transmissions to and from star communication network 16 and at least one MCU that controls and manages transmissions to and from the radios. In operation, shopping cart 50 may be tracked through the store and about the store's premises by use of the location tracking function of the radio configured to mesh communication network 14. Weight data is preferably transmitted using the radio configured for use on star communication network 16. Central computer 23, in this embodiment, serves as the manager, organizer and repository of data transmitted to and received from shopping cart 50.

In another embodiment herein shopping cart 50 may contain a suitable type and amount of memory to store the sensed weight of items placed within shopping cart 50. Such memory, if present, will preferably, but not necessarily, reside within transmission device 66 and be in connected communication with one or more radios positioned within transmission device 66 that are responsible for transmitting weight information to multi-network 10.

Figure 9:
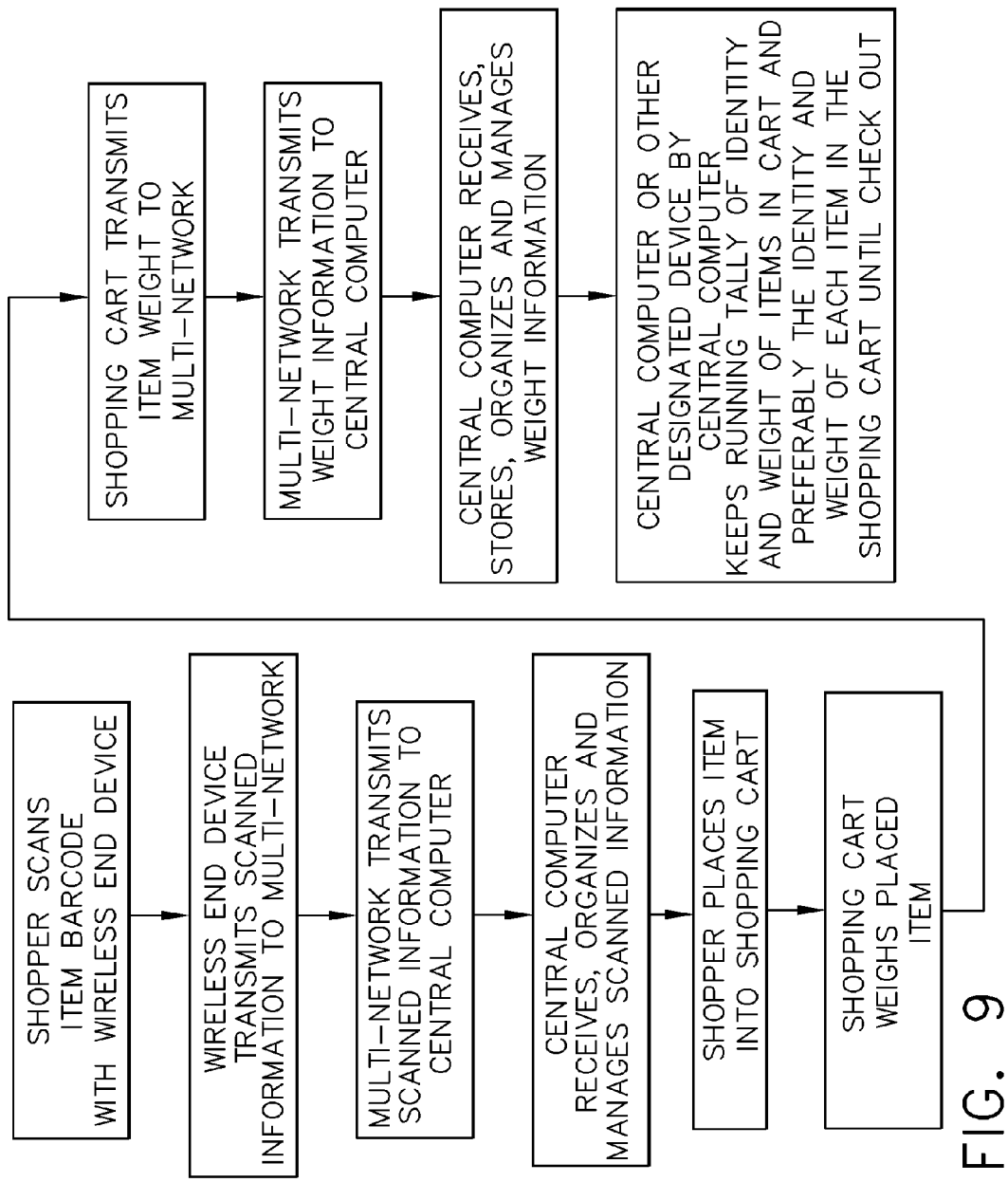
FIG. 9 provides a flow chart of a shopper's ideal behavior within a store herein.

FIG. 9 provides a diagram of a shopper's preferred interaction with the method for shopping described herein. The diagram of FIG. 9 is preferred because it describes a shopper's and the method's ideal actions when working properly together. For example, to begin one aspect of the interaction a shopper 7 selects an item from a store shelf or display. Shopper 7 then scans the item's bar code using wireless end device 40. Shopper 7 then either places the item into shopping cart 50 (i.e., along the shopping cart's base) or places the item into a bag connected to one or more weighing members 58 positioned about shopping cart 50. Once an item is weighed by one or more weighing members 58 positioned about shopping cart 50 that weight information is preferably immediately transmitted to multi-network 10 though it may be stored temporarily for later transmission.

It is important to note that in one preferred embodiment herein none of the weighing members 58 positioned about shopping cart 50 nor the shopping cart 50 itself retains or stores the weight information once such information is measured. Instead, once gained the weight information is preferably transmitted away from shopping cart 50 to multi-network 10 for storage, organization and management within central computer 23 and/or some other suitable storage device heretofore discussed and connected to multi-network 10.

In practice, central computer 23 keeps track of the running total of all items scanned and added to shopping cart 50. This running total may be retrieved by shopper 7 or a point of sale server upon demand and transmitted from central computer 23, through multi-network 10 to wireless end device 40.

Figure 10:
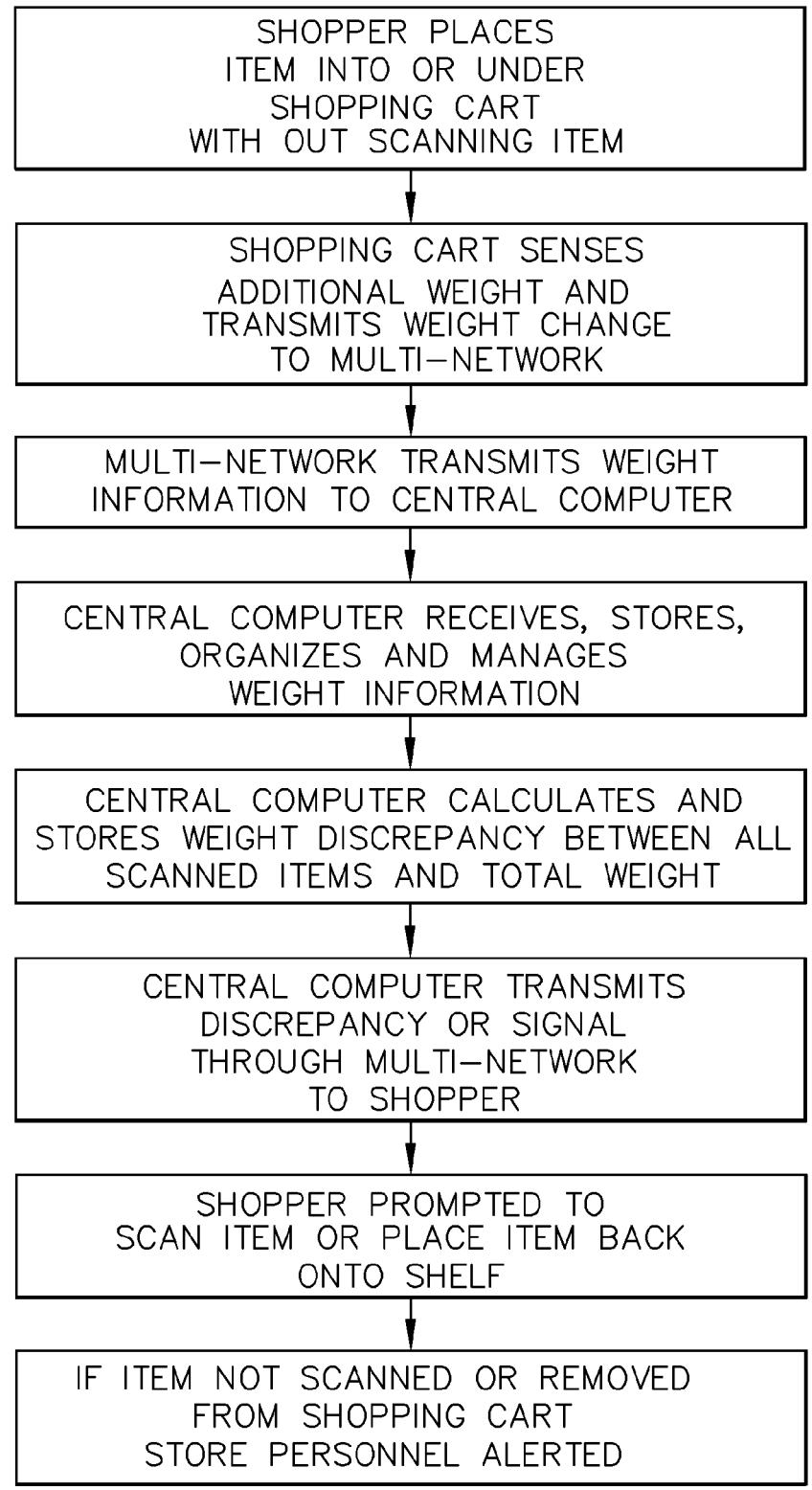
FIG. 10 provides a flow chart of a shopper's non-ideal behavior within a store herein.

Ideally, shopper 7 will follow the prescribed path as shown in FIG. 9. Unfortunately, shoppers within a store often exhibit non-ideal behavior. FIG. 10 provides a diagram of a shopper's non-ideal behavior in a store 5 herein. Whether done intentionally or not, shopper 7 may not scan an item or may mis-scan an item before placing it into shopping cart 50. If that happens, an increase in overall weight is sensed by shopping cart 50. This weight increase is preferably immediately transmitted through multi-network 10 to central computer 23 and/or some other suitable storage device connected to multi-network 10.

Once there the weight discrepancy is calculated between the actual weight (i.e., all the weight that's been measured and then recorded) and the weight of all items scanned. That weight discrepancy is stored and the overall weight is continually updated as necessary when the discrepancy is increased or decreased due to further activity by shopper 7.

Once the weight discrepancy is calculated it is transmitted back through multi-network 10 to wireless end device 40. Either a message or an alarm within wireless end device 40 is communicated to the shopper to inform her that an un-scanned or unexpected weight increase has occurred. The purpose of this communication is to offer shopper 7 an opportunity to scan a previously un-scanned item placed within shopping cart 50 or to remove the item from shopping cart 50 altogether and place it back onto a store shelf. Preferably, the communication to shopper 7 that an un-scanned item has been placed into shopping cart 50 is instantaneous or nearly instantaneous. The time between the two events, i.e., the placement of an un-scanned item into shopping cart 50 and notification to the shopper thereof, should preferably be short enough to prevent shopper 7 from moving significantly beyond the collection point of the un-scanned item so that shopper 7 has an opportunity to place the item back at its collection point.

In the event that shopper 7 does not place an un-scanned item back onto a store shelf or does not scan the item so that central computer 23 via multi-network 10 gains recognition of the item, store personnel may be alerted. Upon such an alert store personnel, according to whatever store policy or anti-theft mechanisms exists, may intercede as appropriate to prevent either an honest mistake or outright theft attempt.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for enabling a shopper to shop in a store having purchasable items, comprising:
    A) Providing
        1) Scan readable media approximate to said purchasable items;
        2) A wireless end device;
        3) A central computer; and
        4) A communications multi-network having
            a) A mesh communication network for tracking a location of said wireless end device throughout a store; and
            b) A star communication network for transfer of data from said central computer to said wireless end device and from said wireless end device to said central computer;
    B) Connecting said central computer operatively to said communications multi-network;
    C) Positioning said wireless end device in close proximity to said shopper, said wireless end device being positioned to travel with said shopper through said store;
    D) Scanning said readable media on said purchasable items, said scanning producing scanning data;
    E) Transmitting said scanning data through said star communication network of said communications multi-network to said central computer;
    F) Updating said location of said wireless end device through said mesh communication network to said central computer, said updating producing location tracking data; and
    G) Transmitting said location tracking data through said mesh communication network of said communications multi-network to said central computer, said central computer operating to continually update said shopper's position based on said location tracking data received by said central computer.

2. The method of claim 1 wherein said at least one mesh communications network of said communications multi-network operates within a beacon enabled or a non-beacon network.

3. The method of claim 1 wherein said at least one mesh communications network of said communications multi-network operates within a beacon enabled network or a non-beacon enabled network.

4. The method of claim 1 wherein said communications multi-network comprises two or more star communication networks.

5. The method of claim 1 wherein said wireless end device is a reduced function device.

6. The method of claim 1 wherein said wireless end device is a full function device.

\* \* \* \* \*